(12) United States Patent
Veltman

(10) Patent No.: US 6,552,509 B2
(45) Date of Patent: Apr. 22, 2003

(54) METHOD AND A DEVICE FOR SENSORLESS ESTIMATING THE RELATIVE ANGULAR POSITION BETWEEN THE STATOR AND ROTOR OF A THREE-PHASE SYNCHRONOUS MOTOR

(75) Inventor: Andre Veltman, Culemborg (NL)

(73) Assignee: GTI Electroproject B.V., Zaandam (NL)

( * ) Notice: Subject to any disclaimer, the term of this patent is extended or adjusted under 35 U.S.C. 154(b) by 0 days.

(21) Appl. No.: 09/852,812

(22) Filed: May 10, 2001

(65) Prior Publication Data
US 2002/0060546 A1 May 23, 2002

Related U.S. Application Data
(60) Provisional application No. 60/212,758, filed on Jun. 20, 2000.

(30) Foreign Application Priority Data
May 10, 2000 (NL) ............................................. 1015153

(51) Int. Cl.[7] ................................................. H02P 5/40
(52) U.S. Cl. ...................... 318/807; 318/805; 318/811
(58) Field of Search .................................. 318/700, 705, 318/712, 715, 720, 778, 779, 798, 799, 805, 807–811

(56) References Cited

U.S. PATENT DOCUMENTS 4,763,058 A * 8/1988 Heining et al. ............. 318/807
5,585,709 A * 12/1996 Jansen et al.

* cited by examiner

Primary Examiner—Khanh Dang
(74) Attorney, Agent, or Firm—Porter, Wright, Morris & Arthur LLP (57) ABSTRACT

A method for sensorless estimation of the relative position between the stator and the rotor of a three-phase synchronous motor during operation. The method comprises the steps of low-pass filtering of the terminal voltage, low-pass filtering of the terminal current, high-pass filtering of the terminal current and determining the rotor speed. Next the relative angular position is determined from the filtered magnitudes and corrected with an angular correction derived from the rotor speed.

17 Claims, 5 Drawing Sheets

METHOD AND A DEVICE FOR SENSORLESS ESTIMATING THE RELATIVE ANGULAR POSITION BETWEEN THE STATOR AND ROTOR OF A THREE-PHASE SYNCHRONOUS MOTOR

This application claims the benefit of Ser. No. 60/212,758, filed Jun. 20, 2000.

BACKGROUND OF THE INVENTION

The invention relates to a method and a device for sensorless estimation during operation of the relative position between the stator and the rotor of a three-phase synchronous motor comprising a stator having a stator winding comprising terminals for connecting terminal voltage and terminal current, and a magnetic rotor.

In order to achieve an optimum control of the torque developed by a synchronous motor, it is necessary to know the angle between the magnetic flux vector developed by the stator winding during operation and the current vector of the electric current in the stator winding.

In practice, sensors mounted on the shaft of a rotary synchronous motor or, in the case of a linear synchronous motor, a large number of Hall sensors mounted along the track, i.e. the stator of the linear synchronous motor, are inter alia used for determining the aforesaid angle.

The use of sensors of this kind is by no means preferred. The reason for this is that such sensors are generally vulnerably, sensitive to vibration, fouling, incapable of withstanding high temperatures, static electricity, etcetera, but also because separate wiring is required for connecting the sensors. Said wiring is a further source of trouble and generally it also adds significantly to the cost of the installation as a whole.

Determination of the angle between the magnetic flux vector and the stator current vector without making use of mechanical sensors, also called sensorless control, is very important to the industry.

Prior art sensorless methods frequently employ the position-dependent characteristics of a synchronous motor, such as a (small) difference in the inductivity of the stator winding along the so-called (direct) d-axis and the quadrature (q-axis) of the rotor. It is not possible to use this method with linear motors, however, because the air gap between the stator and the rotor (that is, the trolley or the like moving along the track) is relatively much larger with these motors. In addition, with linear motors only part of the stator (the track) is covered by the rotor. An additional problem as regards the determining of the inductivity of the stator winding occurs with linear motors when switched stators are used, that is, wherein just part of the total stator (the track) is constantly activated in dependence on the position of the rotor (the trolley). With linear synchronous motors for high powers and high speeds the system parameters, such as the instantaneous inductivity and resistance of the stator winding, can furthermore change by a large percentage many times per second.

BRIEF SUMMARY OF THE INVENTION

Accordingly, it is a first object of the invention to provide a method for the sensorless provision of an estimate of the relative angular position between the stator and the rotor of a synchronous electric motor, which method can be used both for rotary motors and for linear motors.

In accordance with the invention, this objective is accomplished by means of a method comprising the steps of:

low-pass filtering of the terminal voltage;
low-pass filtering of the terminal current;
high-pass filtering of the terminal current;
determining the rotor speed; and
determining from these filtered magnitudes the relative angular position, corrected with an angular correction derived from the rotor speed.

The invention is based on the insight that an estimate of the magnetic field flux can be obtained by filtering the terminal voltage and the terminal current as described above, so that there is no need for circuits for differentiating the current and for performing open loop integration of the voltage, which are difficult to realise by electronic means.

The instantaneous impedance of the stator winding must be known in order to be able to determine the relative angular position.

In an embodiment of the invention, wherein the stator winding is supplied with electric energy by a pulse width modulator, the impedance is determined from a modulator-induced switching ripple in the terminal voltage and the terminal current.

For determining the switching ripple it is necessary to remove the ground harmonic from the electric energy delivered to the stator winding by the pulse width modulator. The reason for this is that the ground harmonic component does not provide any information as regards the instantaneous inductivity and resistance of the stator winding. Since the synchronous motor is capable of accelerating very quickly in practice, the filtering out of the ground harmonic component by means of conventional low-pass filters is not an option.

In accordance with a further embodiment of the invention, the ground harmonic component is effectively removed from the energy supplied to the stator winding by means of transformation to a system of coordinates that is synchronous to the rotor. In this system of coordinates the ground harmonic component is transformed into a DC component at any possible rotor speed. Once this DC component has been removed, only the switching ripple on the stator current and the stator terminal voltage remains.

In another embodiment of the method according to the invention, the terminal voltage of the synchronous motor is low-pass filtered and the stator current is high-pass filtered and low-pass filtered prior to said transformation, wherein the ground harmonic is removed from the transformed stator terminal voltage and stator current by high-pass filtering, which results in a transformed stator terminal voltage ripple and a transformed stator current ripple.

As a result of said low-pass filtering of the stator terminal voltage the transformed stator terminal voltage ripple corresponds to the terminal flux of the stator winding, so that in accordance with yet another embodiment of the method according to the invention the instantaneous inductivity of the stator winding can be estimated from the quotient of the stator terminal voltage ripple and the stator current ripple, wherein it is assumed that the relation between the current and the flux in a coil is linear, as long as the coil is magnetically unsaturated, of course.

In accordance with the invention said quotient can be advantageously determined from the continuous or running average of the product of the stator terminal voltage ripple and the stator current ripple divided by the continuous or running average of the square of the stator current ripple, wherein these current averages can be determined from low-pass filtering of the products in question.

It has been found that in the case of relatively high-power motors the impedance of the stator winding is generally dominant in comparison with the resistance of the stator winding at any speed. In yet another embodiment of the method according to the invention it suffices to select a fixed value for the stator winding resistance, among which a resistance that equals zero. Generally the error that is thus introduced in the estimated angular position is just small.

With low motor speeds and high current values the terminal voltage of the stator winding may be up to 100 times larger than the internal voltage of the stator winding, as a result of which it is no longer possible to derive the inductivity and resistance for estimating the relative angular position from the switching ripple with a desired degree of accuracy.

For the purpose of determining the relative angular position near standstill of the rotor, the electric energy that is supplied to the stator winding by the pulse width modulator is interrupted in yet another embodiment of the method according to the invention, wherein the stator terminal voltage is measured and the angular position is estimated from the stator terminal voltage measured during the interruption in the energy supply.

This embodiment is based on the insight that the measured stator terminal voltage, when the stator current equals zero, is exactly the same as the internal voltage, which is in turn determined by the change in the magnetic flux. Consequently, it is possible to determine the magnetic flux and thus the relative angular position between the stator and the rotor from the measured terminal voltage.

According to an embodiment of the invention an effective determination of the angular position can be obtained around standstill of the rotor as well by alternately exciting and interrupting the energy supply to the stator winding.

The invention furthermore provides for the automatic switching over from determination of the angular position from the switching ripple on the one hand to determination of the angular position from the interruption of the energy supply on the other hand, in such a manner that when the stator terminal voltage that is measured during the interruption in the energy supply exceeds a predetermined value, the angular position is estimated on the basis of the switching ripple. This method of switching over can be employed for all types of motors with all conceivable stator and rotor configurations on the basis of the highest allowable current value in the stator winding and a desired current value.

In a yet further embodiment of the method according to the invention, compensation is effected for asymmetry effects due to phase switching effects in a three-phase motor and other secondary effects, as well as for low-speed and high-speed rotation of the rotor on the calculated angular position and corrections in the calculated angular positions due to $5^{th}$ harmonic flux distortion.

The method according to the invention is suitable for determining the relative angular position between the stator and the rotor of synchronous motors comprising a permanent magnetic rotor, an electrically energized rotor, single-phase motors, polyphase motors, rotary motors and linear motors, irrespective of the power thereof.

The invention furthermore relates to a device for estimating the relative angular position between the stator and the rotor of a synchronous motor in accordance with the above-described method, wherein the stator winding is supplied with electric energy by a pulse width modulator.

DETAILED DESCRIPTION OF THE INVENTION

The description below, in which the invention is explained in more detail, proceeds from—generally three-phase—synchronous machines, wherein permanent magnets are used. In English-language professional literature such three-phase synchronous machines are known by the acronym PMSM ("Permanent Magnet Synchronous Machines"). Furthermore it is assumed that the permanent magnets are present on the moving part of the motor, that is, the rotor, and that the windings on the non-moving part, the stator, are energized by means of a controllable supply source, preferably a pulse width modulator, which may be a three-phase modulator, if necessary. Furthermore it is assumed that a linear motor can be regarded as an "unrolled" rotary motor.

In the case of a three-phase synchronous motor, the magnetic field flux is considered as a flux vector $\vec{\Psi}_m$. The currents in a three-phase stator winding can likewise be reduced to an effective current vector $\vec{i}$.

When the flux vector is written as a complex magnitude according to:

$$\vec{\Psi}_m = \Psi \cdot e^{j\Theta} \qquad (1)$$

wherein:

$\Psi$=the strength of the magnetic flux $\ominus$=the relative angular position between the magnetic flux vectors of the stator and the rotor, it is easy to see that a change in the relative angular position between the stator and the rotor will cause a change in the flux of the stator winding, which can be detected as an induced voltage $\vec{e}$.

The induced voltage $\vec{e}$ is an internal magnitude, which cannot be directly measured at the terminals of the stator winding because of the impedance of the stator winding.

Assuming that the impedance of the stator winding includes an ohmic resistance portion R and an inductivity portion L, the voltage at the terminals of the stator winding can be calculated according to:

$$\vec{e} = \frac{d\vec{\Psi}_m}{dt} \quad (2)$$

$$\vec{F} = \vec{i} \times \vec{\Psi}_m \quad (3)$$

$$\vec{u} = R \cdot \vec{i} + L\frac{d\vec{i}}{dt} + \vec{e} \quad (4)$$

wherein:

F=the torque or driving force exerted on the rotor.

From equation (4) it appears that the induced voltage e can be determined when the values of R and L as well as the instantaneous values of i, di/dt and u are known.

A problem thereby is caused by the fact that when rotor speeds are low and stator currents are high, the voltage u may be as much as 100 times higher than the voltage e, as a result of which it cannot be determined with sufficient accuracy. For determining the desired angle at low speeds the current i must be reduced to zero, which implies, however, that no driving force F will be generated in that case.

In order to avoid the term di/dt, which is difficult to realise by means of electronic circuits, it is often attempted to write equations (2) and (4) in the form of an integral equation according to:

$$\Psi_m = \int (u - i \cdot R) dt - L \cdot i \quad (5)$$

Realising equation (5) by means of electronic circuits requires open loop integration, however, which is also very difficult to realise, even with accurate estimates of R and L, due to drift and the like.

The invention is based on the insight that equation (5), after multiplication of the left-hand and right-hand parts thereof by the transfer function of a high-pass filter, in accordance with the Laplace notation results in:

$$\hat{\Psi} = \frac{sT}{1+sT} \cdot \Psi_m = \frac{T}{1+sT} \cdot (u - i \cdot R) - \frac{sT}{1+sT} \cdot i \cdot L \quad (6)$$

wherein:

$\hat{\Psi}$=the estimated magnetic flux s=the Laplace operator

T=the time constant of the high-pass filter wherein:

$\omega_1$=1/T=the turnover frequency of the high-pass filter.

From equation (6) it can be seen that an integrator multiplied by a high-pass filter results in a low-pass filter T/(1+sT), so that it will suffice for the purpose of the invention to use low-pass filtering of the terminal voltage and the terminal current of the stator winding. Open loop integration, which is difficult to realise by electronic means, is thus avoided, but an influence that remains is the fact that in equation (6) the angle of the estimated flux vector $\hat{\Psi}$ is displaced with the phase angle of the respective high-pass filter at the frequency at which the synchronous machine operates.

Consequently, the invention comprises an effective compensation of this phase angle in the estimated flux vector, as a result of which an integrator function is created without open loop problems (drift and offset) and wherein there is no longer any phase displacement after this compensation, of course.

Furthermore it follows from equation (6) that an angle of 90° exists between the actual magnetic field flux $\Psi_m$ and the estimated flux $\hat{\Psi}$ at standstill. At an angular frequency $\omega = \omega_1 = 1/T$, this phase displacement is 45°, and at very high speeds the phase error eventually shifts to 0°.

For positive values of $\omega$ the phase error can be written as:

$$\Phi = \frac{\pi}{2} - \arctan(\omega \cdot T) \quad (7)$$

wherein:

$\phi$=the phase error.

On the basis of equation (7) an estimate of the instantaneous motor speed can be provided, which is proportional to the angular frequency $\omega$.

Figure 1:
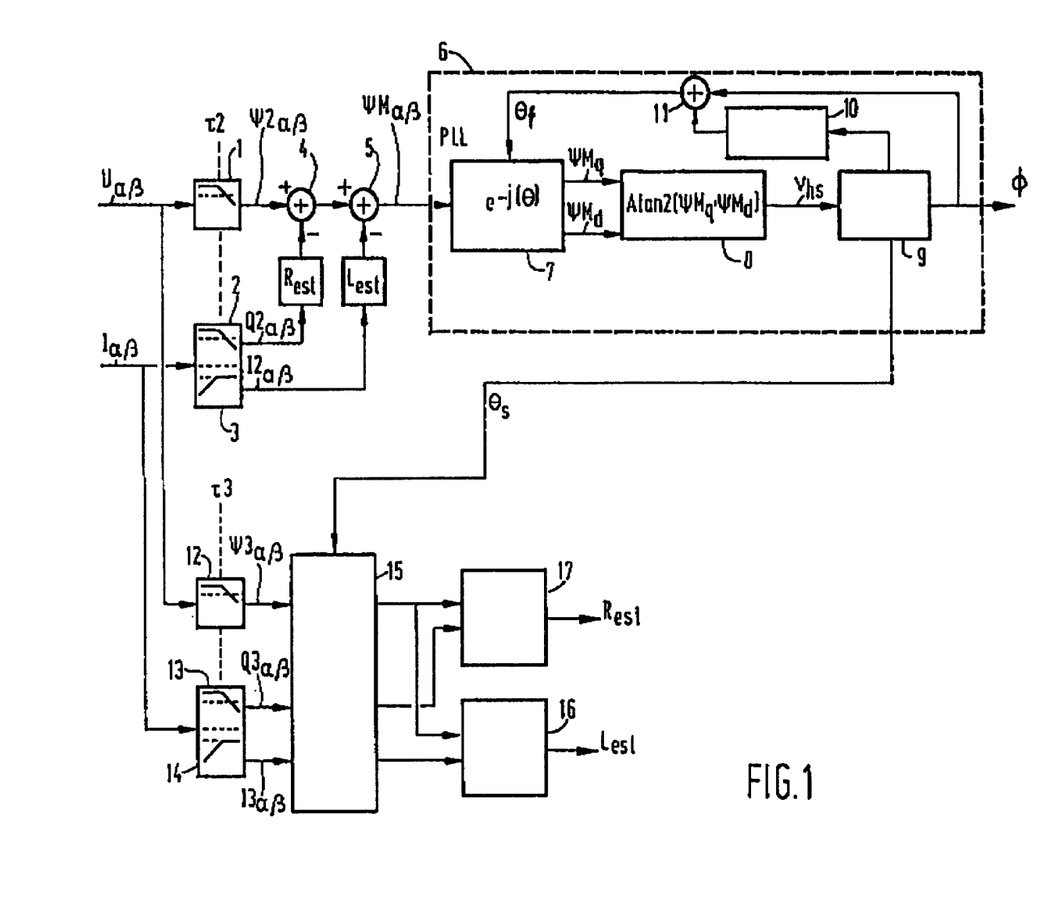
FIG. 1 is a block diagram showing an embodiment of a device for implementing the method according to the invention.

Now consider the block diagram of FIG. 1.

In this figure, all signals provided with subscript $\alpha\beta$ are vectors consisting of an $\alpha$-component and a $\beta$-component in an orthogonal system of coordinates $\alpha, \beta$ which refers to the "fixed" world.

$U_{\alpha\beta}$ is the terminal voltage at the stator winding, and $I_{\alpha\beta}$ is the terminal current in the stator winding.

Equation (6) is realised herein by means of low-pass filters 1, 2, high-pass filter 3, an estimate $R_{est}$, being an estimate of the resistance portion of the impedance of the stator winding, an estimate $L_{est}$, being the inductivity portion of the impedance of the stator winding, and summation means 4, 5, which are connected as shown in the figure.

Because flux is the integral of voltage, the terms "low-pass filtered voltage" and "high-pass filtered flux" are equivalent. Further, the integral of current equals charge Q.

That means, low-pass filtering of $U_{\alpha\beta}$ provides a term proportional to the high-pass filtered magnetic flux $\Psi 2_{\alpha\beta}$, low-pass filtering of the terminal current $I_{\alpha\beta}$ provides a charge term $Q2_{\alpha\beta}$, and the high-pass filtered current $I_{\alpha\beta}$ provides a high-pass filtered current term $I2_{\alpha\beta}$.

Multiplication of $Q2_{\alpha\beta}$ with $R_{est}$ and multiplication of $I2_{\alpha\beta}$ with $L_{est}$ and the deduction, via summation means 4, 5, respectively, of the thus multiplied terms from $\Psi 2_{\alpha\beta}$ leads to an estimate of the magnetic flux $\Psi M_\alpha$ that corresponds to the estimated flux $\hat{\Psi}$ according to equation (6).

The index "2" in the filtered magnitudes refers to the time constant T2 of the respective filters 1, 2, 3.

As explained above, a correction of the estimated flux $\Psi M\alpha\beta$ with the phase error $\phi$ from equation (7) is required for determining the actual magnetic field flux $\Psi_m$. This is effected in the device according to the invention by means of a non-delayed low-pass filter 6 having a PLL (Phase Locked Loop) structure.

Filter 6 consists of a vector rotator 7, which processes the estimated magnetic field flux $\Psi M_{\alpha\beta}$ into a component $\Psi M_q$ and a component $\Psi M_d$, that is, a component along the direct or d-axis and a component along the quadrature or q-axis of the rotor.

The operation arctan $2(\Psi M_q, \Psi M_d)$ provides an estimate of the angular frequency $V_{hs}$ by means of a circuit 8 that has been adapted for this purpose. An estimate of the frequency $\omega$ at which the rotor rotates is determined therefrom by means of a controller 9. This frequency $\omega$ is used for determining the angular phase error $\phi$ in accordance with equation (7) by means of a suitably implemented circuit 10. From the angle and speed of the magnetic flux vector $\Psi$ determined by the controller 9 and the phase error $\phi$ according to the circuit 10, a feedback angle $\ominus_f$ is supplied to the vector rotator by means of a summator 11 for the purpose of suitably rotating the estimated magnetic flux vector $\Psi M_{\alpha\beta}$.

Knowledge of the values of L and R is essential for determining the relative angular position $\ominus$, as clearly follows from equation (6).

In large machines the impedance of the stator winding at any speed is generally dominated by the reactance ωL. That is, ωL is generally dominant in comparison with the ohmic resistance R. As already described in the introduction, the inductivity portion L and the resistance portion R can change by a large percentage many times per second, so that it is in any case not possible to proceed from a predetermined value of the inductivity L.

In order to determine the instantaneous value of L, use is made according to the invention of the switching ripple caused by a controllable current source, such as a pulse width modulator which supplies the motor with electric energy. The ground harmonic components of both the current and the voltage do not provide any information as to R and L, because the voltage e strongly influences the phase and amplitude of the current I relative to the terminal voltage u. As a consequence, the ground harmonic components of both the current and the flux must be removed in order to provide an estimate of L.

In a preferred embodiment of the invention, the ground harmonic component is effectively removed by transformation of the low-pass filtered terminal voltage, the low-pass filtered terminal current and the high-pass filtered terminal current to a system of coordinates that is synchronous to the rotor, related to the angle $\ominus$ of the instantaneous estimated flux vector. In this system of coordinates the ground harmonic component is transformed into a DC component at any possible speed. This DC component can be removed by means of a high-pass filter, so that only the ripple on the current and the terminal flux, that is, the low-pass filtered terminal voltage, remains. Since the relation between the terminal voltage and the terminal flux in a coil is linear, it is possible, providing that the coil or winding in question is not saturated, by means of a correlator to determine the most fitting quotient, the estimated inductivity, from said ripple in accordance with:

$$L_{est} = \frac{\Delta \Psi}{\Delta i} = \frac{\Delta \Psi \cdot \Delta i}{(\Delta i)^2} \qquad (8)$$

wherein:

ΔΨ=the magnetic flux ripple

Δi=the current ripple.

Let us consider FIG. 1 anew. In order to make clear that filtering of the terminal voltage $U_{\alpha\beta}$ and the terminal current $I_{\alpha\beta}$ can be carried out with filters at a different turnover frequency for the purpose of determining the current ripple and the flux ripple, further low-pass filters 12, 13 and a high-pass filter 14 are shown, with a time constant T3, which provide the filtered magnitudes $\Psi 3_{\alpha\beta}$, $Q3_{\alpha\beta}$ and $I3_{\alpha\beta}$, respectively. The index "3" refers to the time constant T3 of the filters 12, 13, 14. These magnitudes are fed to a circuit 15 for the purpose of removing the ground harmonic or fundamental components from the filtered magnitudes by means of transformation to a system of coordinates that is synchronous to the rotor. This results in a magnetic flux ripple $\Psi_{rip}$, a charge ripple $Q_{rip}$, and a current ripple $I_{rip}$. Estimates for the inductivity portion $L_{est}$ and the resistance portion $R_{est}$ are determined therefrom by means of correlators 16, 17.

Figure 2:
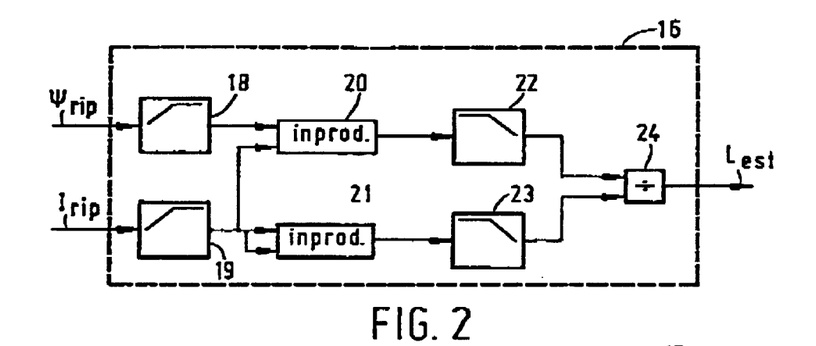
FIG. 2 is a block diagram showing a circuit for estimating the instantaneous inductivity portion of the impedance of the stator winding according to the invention.

FIG. 2 shows an embodiment of a correlator 16, wherein the magnetic flux ripple $\Psi_{rip}$ and the current ripple $I_{rip}$ are high-pass filtered by means of filters 18, 19. Then the in-products or dot-products of the vectors $\Psi_{rip}$ and $I_{rip}$ and of $I_{rip}$ and $I_{rip}$, respectively, are determined by means of circuits 20, 21. The dot-products thus obtained are low-pass filtered by means of filters 22, 23, respectively, after which the quotient is determined by means of a divisor 24. All this in accordance with equation (9).

Figure 3:
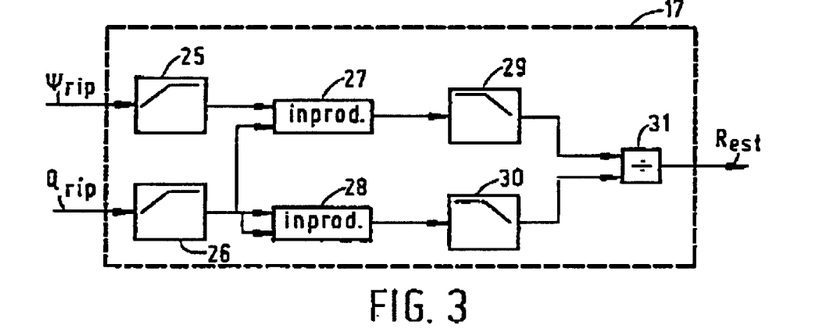
FIG. 3 is a block diagram showing a circuit for estimating the resistance portion of the stator winding according to the invention.

An estimate for the resistance portion $R_{est}$ is obtained from the flux ripple $\Psi_{rip}$ and the charge ripple $Q_{rip}$ through high-pass filtering by means of filters 25, 26, subsequent determination of the dot-products of $\Psi_{rip}$ and $Q_{rip}$ by means of a suitable circuit 27, determination of the dot-product of $\Psi_{rip}$ and $Q_{rip}$ by means of a respective circuit 28, subsequent low-pass filtering of the determined dot-products by means of respective low-pass filters 29, 30 and the subsequent determination of the quotient from said filtered dot-products by means of a divisor 31.

Figure 4:
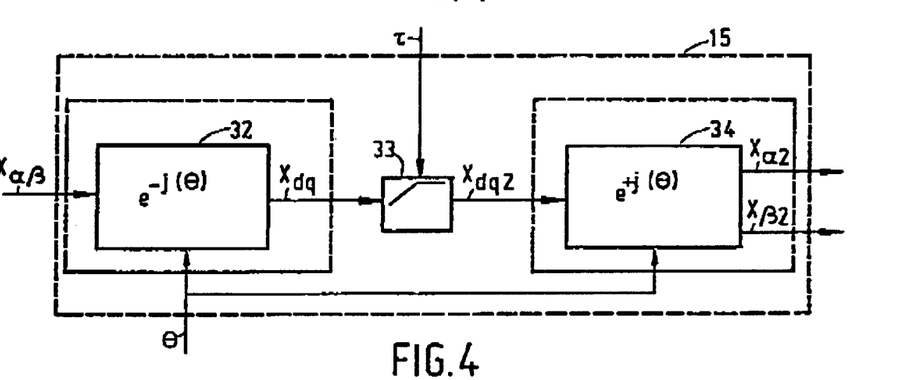
FIG. 4 is a block diagram showing a circuit for determining the switching ripple from the filtered terminal voltage and the terminal current in accordance with the invention.

FIG. 4 shows a possible implementation of the circuit 15 for transforming the filtered magnitudes $\Psi 3_{\alpha\beta}$, $Q3_{\alpha\beta}$ and $I3_{\alpha\beta}$. FIG. 4 shows the various operations for a random one of said magnitudes, indicated $X_{\alpha\beta}$, by means of a first vector rotation 32, high-pass filtering 33 and the subsequent back transformation by means of vector rotation 34. From vector rotator 34 the components in the α, β coordinate system remain.

Near standstill an estimate is determined, wherein a fixed value of R, among which the value zero, is taken as a starting point.

The invention also provides for the switching over from estimation of the impedance values around standstill to estimation of these values when the motor in question has run up to speed more or less.

Those skilled in the art will appreciate that in practise, for example in the case of a three-phase motor, due to successive switching of the controllable supply source, the three impedances $Z_u$, $Z_v$ and $Z_w$ relating to the phases u, v, w will be unequal causing a symmetry effect.

In the αβ-plane, the inductance can be visualized by a so-called flux orbit.

In a symmetrical motor model, the impedance is constant in every direction. If the current orbit is circular, the resulting impedance-flux will also be circular.

For asymmetrical impedances, however, the situation is more complicated. In stead of being circular, the flux orbit will resemble an ellipse form.

For a three-phase motor, the three parameters that together determine the inductance are the three phase-inductances $L_u$, $L_v$ and $L_w$. These are orientated under angles of 120°.

In case of asymmetries, the impedance estimators 16, 17 providing an estimate for the inductivity portion $L_{est}$ and the resistance portion $R_{est}$ can be extended with an asymmetry estimator based on an elliptic impedance model.

Figure 5:
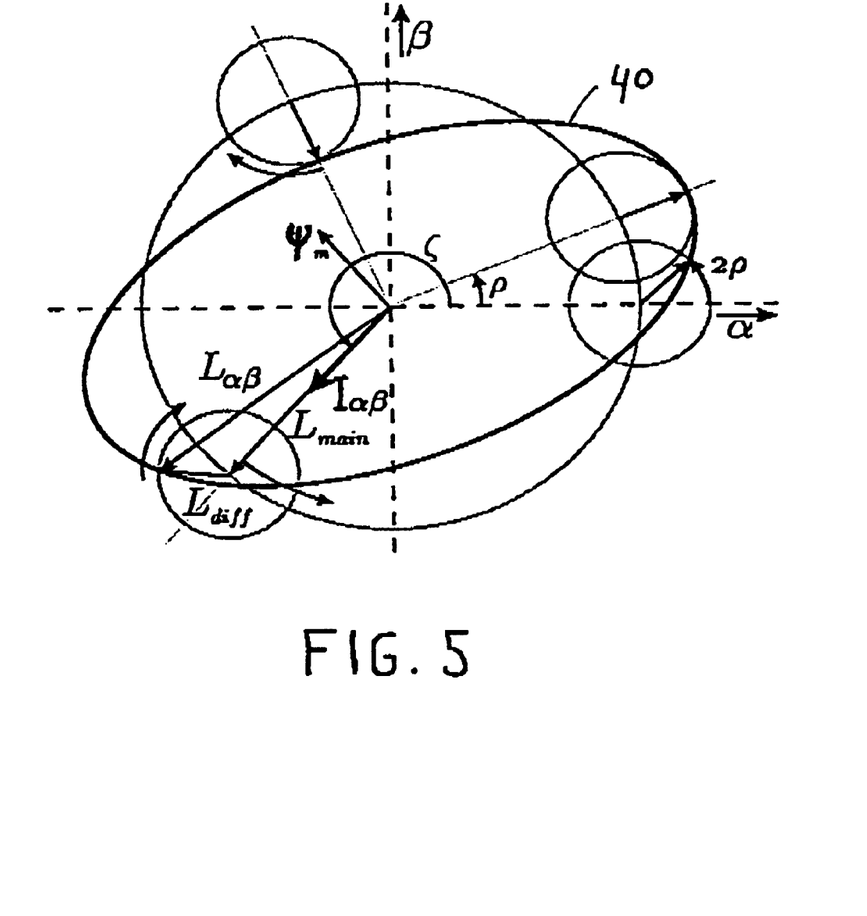
FIG. 5 is a graphical representation of a trigonometric construction of elliptical inductance by superposition of vectors.

FIG. 5 shows a trigonometric construction of an elliptical inductance $L_{\alpha\beta}$ by super position of vectors $L_{main}$ and $L_{diff}$. The angle ρ is the orientation angle of the ellipse 40.

From the trigonometric construction of FIG. 5, the flux can be calculated as the superposition of the two vectors that define the ellipse.

The generated flux can be calculated as the superposition of the two vectors that define the ellipse. The generated flux no longer points in the same direction as the current, such that the inductance can not be modelled as a real scalar number, but must be a vector in the complex plane. It can be shown that the inductance is a vector with magnitude $L_{main}$ along the real axis, with a superimposed smaller vector which rotates in the complex plane. The magnitude of this smaller vector is $L_{diff}$ and it rotates with a frequency $\omega_{Ldiff} = -2\omega_{current}$.

Figure 6:
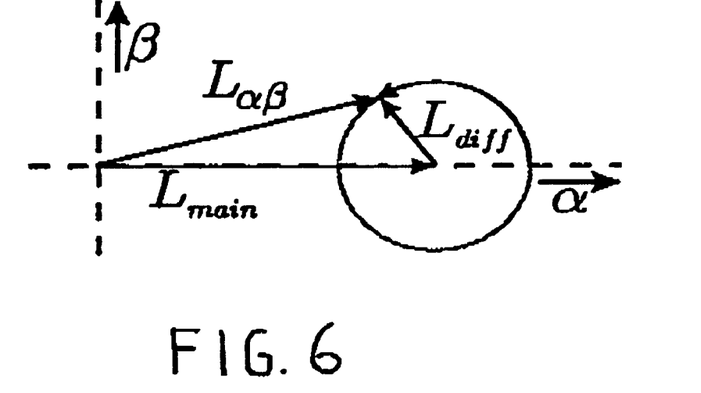
FIG. 6 is another graphic representation of a trigonometric construction of elliptical inductance by superposition of vectors.

FIG. 6 shows a trigonometric construction of the elliptical inductance by superposition of vectors in the αβ plane.

Direct estimation of $L_{main}$ and $L_{diff}$ is not possible. First, the length $L_x$, the width $L_y$ and the rotation angle ρ of the ellipse have to be estimated. $L_{main}$ and $L_{diff}$ can then be calculated by:

$$L_{main}=(L_x+L_y)/2 \qquad (9)$$

$$L_{diff}=(L_x-L_y)/2 \qquad (10)$$

The most straightforward identification method is to make several measurements in different directions. At least three measurements are necessary, so three measurements under relative angles of 120° gives the highest accuracy with minimal effort. The results will improve if the directions of the measurements are chosen according to the direction of the asymmetry.

The signals are rotated with the angle ρ to the xy domain. However, this requires prior knowledge of the angle ρ. Once the estimate $\hat{\rho}$ is known, only two additional measurements are required. These will obviously be made along the long and the short symmetry axis of the ellipse. $L_x$ and $L_y$ are thus estimated directly.

For calculation of the angle ρ a controller can be applied which maximizes the difference between $L_x$ and $L_y$. However, there is also a direct method for the estimation of the angle ρ. It is possible to obtain a crude estimation of $L_{main}$ based on two orthogonal estimations with arbitrary $\hat{\rho}$. This enables to isolate the flux resulting from $L_{diff}$ by subtracting the main inductance from the total impedance flux $\Psi_L$. The result is a flux component that originates from the asymmetry. This assymetry flux vector $\vec{\Psi}_{diff}$ rotates in the negative (clockwise) direction. The rotation direction can be inverted, by inverting one of the axis of the αβ plane, such as the β axis. By doing this, the current vector $\vec{I}$ and the flux vector $\vec{\Psi}_{diff}$ rotate in the same direction and with the same angular velocity. The phase difference between the two vectors is the off-set angle $\vec{\Psi}_{diff}$ (=2ρ).

Figure 7:
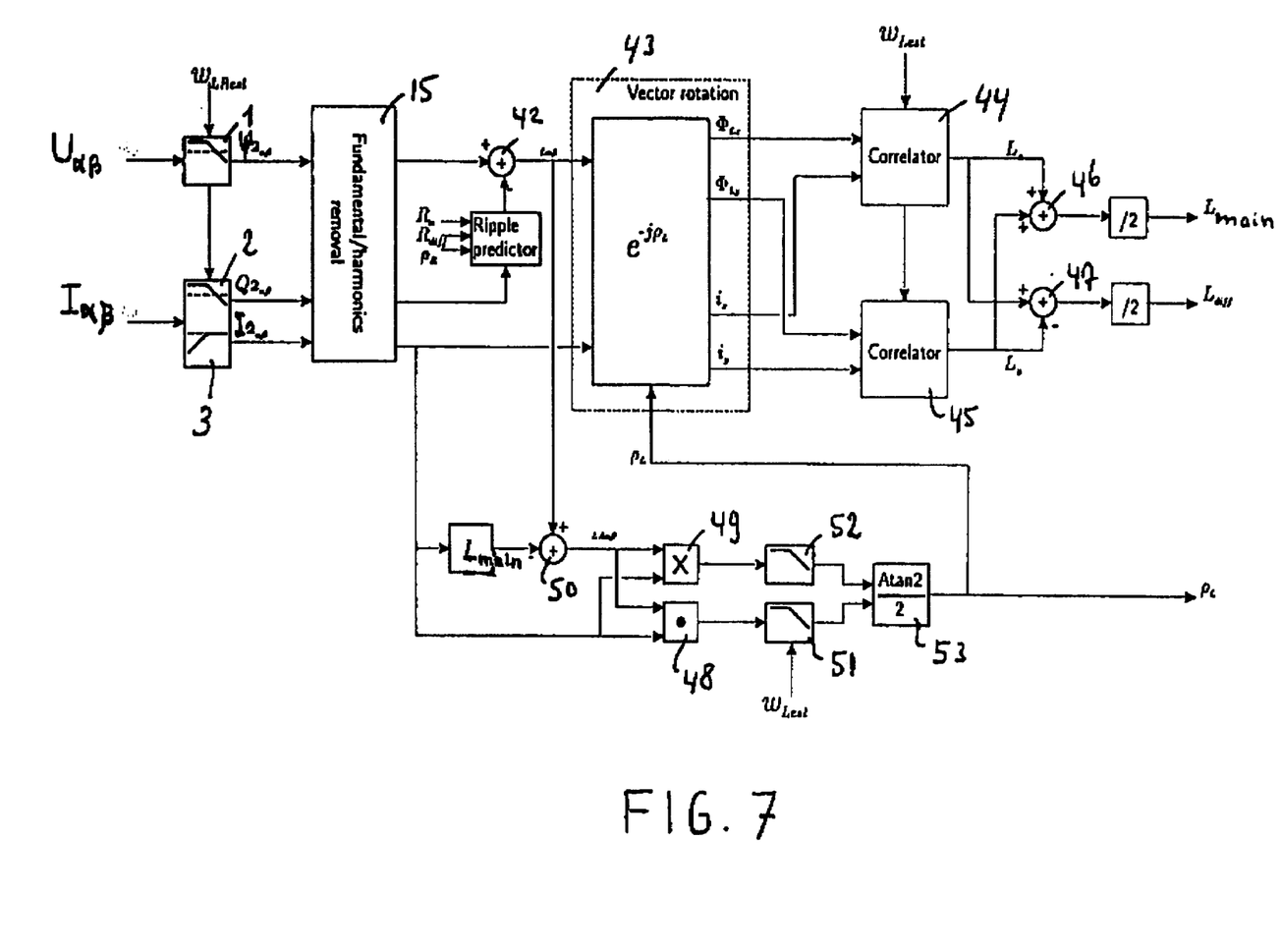
FIG. 7 is a block diagram showing a circuit for estimating elliptical inductance.

A block diagram of the estimator operating as disclosed above is shown in FIG. 7.

In the block diagram of FIG. 7, low-pass filtering of $U_{\alpha\beta}$, low-pass filtering of $I_{\alpha\beta}$ and high-pass filtering of $I_{\alpha\beta}$ is applied using filters 1, 2, 3 as shown in FIG. 1.

The filtered magnitudes $\Psi2_{\alpha\beta}$, $Q2_{\alpha\beta}$ and $I2_{\alpha\beta}$ are fed to a circuit 15 for removing the ground harmonic or fundamental components from the filtered magnitudes. Using a ripple predictor 41 which is fed by the magnitude $Q2_{\alpha\beta}$ and $R_{main}$, and $\rho_R$, defining the ellipse of the resistance portion, using summation means 42 for summation of the output signal of the ripple predictor 41 and the magnitude $\Psi2_{\alpha\beta}$, an estimated flux $\Psi_{L\alpha\beta}$ is obtained. Using a vector rotator 43, $\Psi_{Lx}$, $\Psi_{Ly}$ and $I_x$ and $I_y$ are obtained from $\Psi_{L\alpha\beta}$ and $I2_{\alpha\beta}$. An estimate of $L_{main}$ and $L_{diff}$ is obtained using correlators 44 and 45 and by adding/subtracting the output signals of the correlators using summation means 46, 47, connected as shown in FIG. 7.

An estimate of ρ, i.e. $\hat{\rho}$, is obtained from $\Psi_{L\alpha\beta}$ and $I2_{\alpha\beta}$ obtaining the dot- and cross- or out-products of $I2_{\alpha\beta}$ and $\Psi_{L\alpha\beta}$ corrected for $L_{main}$, respectively using circuits 48, 49 and summation means 50, and by low-pass filtering of the output signals of the circuits 48 and 49 using filters 51, 52, respectively, and a calculation circuit 53 for calculating ½ arctang of the low-pass filtered signals.

The estimated $\hat{\rho}$ is again used to calculate a new estimation of $L_{diff}$, thus closing the loop.

The ρ estimator of FIG. 7 is stable and is capable of compensating asymmetries of up to 50%.

As previously disclosed with reference to FIG. 1, the relative angular position ⊖ is derived using a PLL type filter 6.

During non-operation the PLL is capable of following a uniformly accelerating linear motor, without steady-state error. However, below the cross-over frequency of the high-pass flux filter, the amplitude of the position vector decreases, because the induced electromagnetic force decreases with decreasing velocity. At some point, the induced voltage amplitude will become the same order of magnitude as the error in the estimated impedance voltage drop. Below this point the position estimate will become more inaccurate.

To solve this problem, the current controller will switch to pulsed mode operation. In pulsed mode operation, the current is switched on and off at a low frequency. During the off time, the voltage drop across the impedance is guaranteed to be 0 V, since the current is 0 A. Since for zero current the terminal voltage equals the induced voltage, no impedance compensation is required, and thus the impedance estimate error will not disturb the measured induced voltage. The PLL will lock on the induced voltage angle.

Because the flux filter is in fact a low-pass filter operating on the induced voltage, the filtered induced voltage can not follow the input voltage drop resulting from the current step. The relaxation of the flux filter results in a long waiting period before accurate induced voltage measurements can be made. The PLL input has to be the unfiltered induced voltage, which requires an additional input on the PLL as shown in FIG. 8.

Figure 8:
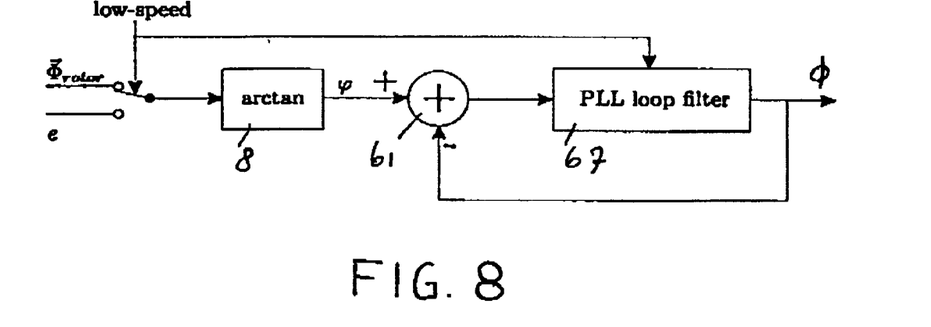
FIG. 8 is a block diagram showing a PLL with two alternative inputs.

The PLL loop filter 67 shown in FIG. 8 is switchable. For pulsed operation, the pass-band of the PLL loop filter has to be decreased. Also the order of the loop filter is decreased by 1 in low-speed mode.

Within the pass-band of the PLL there is an accurate estimate of the angular velocity of the rotor flux. This information can be used for an additional feedback, to compensate for the phase-lead of the high-pass flux filter.

Figure 9:
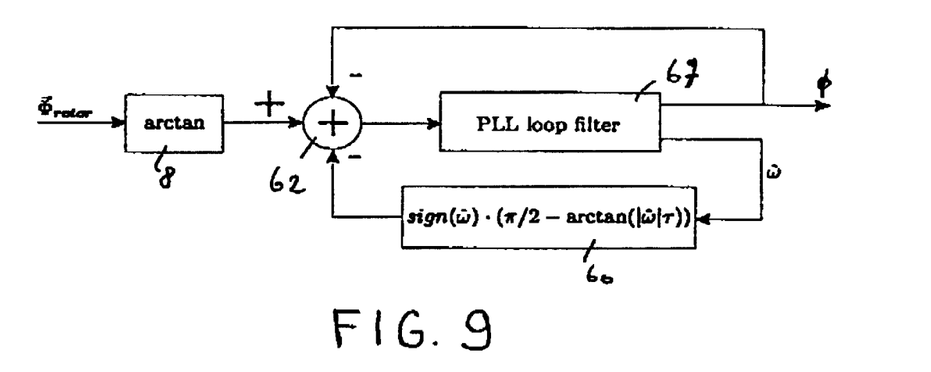
FIG. 9 is a block diagram showing a PLL in high-speed and low-speed configuration with phase-lead compensation.

FIG. 9 shows a block diagram for the PLL 66 in high-speed configuration with phase-lead compensation. As shown in FIG. 9, an additional filter 60 is added providing a negative feedback following:

$$\phi_{comp}=\text{sign}(\hat{\omega})\cdot(\Pi/2-\arctan(|\hat{\omega}|T)) \qquad (11)$$

wherein:

$\hat{\omega}$=the estimated angular frequency;

T=the time constant of the flux filter;

$\phi_{comp}$=compensation of estimated angle φ.

In FIGS. 8 and 9 reference numerals 61, 62 denote summation means. For summing and/or subtracting the signals provided to the summation means 61, 62 in accordance with the signs indicated. $\phi_{rotor}$ is the low-pass filtered induced voltage e.

In the above, it is assumed that the electrical flux angle is equal to the magnetic flux angle, which in turn is identical to the rotor angle ⊖. In practise, this is not always the case. The electrical flux Ψ is the amount of the magnetic flux Ψ coupled by the stator windings. As a result of the stator-winding configuration and the shape of the magnetic field around the magnets of a motor, the orbit of the electrical flux vector is non-circular. The induced electromagnetic voltage is more or less hexagonal. An accurate description of this type of distortion is addition of a $5^{th}$ harmonic component. It can be shown that, in practise, for a genaeral motor type the relative magnitude of the $5^{th}$ harmonic in the induced voltage amounts −23.9 dB, which corresponds to 6.38%. This harmonic component leads to a significant angle error (±3°).

At high velocities, the PLL locks on the flux angle. The error in the flux angle is smaller than in the induced voltage, which corresponds to a more circular orbit. The relative magnitude of the 5$^{th}$ harmonic in the flux is −37 dB, which corresponds to 1.27%. The ratio to the 5$^{th}$ harmonic in the induced voltage is five, because if integrated, a component of five times higher frequency is attenuated five times more by the integrator. This is classic filter theory.

During normal operation, the position estimation uses the rotor flux as input. Because the 5$^{th}$ harmonic is five times smaller in the rotor flux than in the induced voltage, the error will be neglectable. However, at low speed the influence of the flux filter becomes significant. The input signal of the PLL more-and-more approaches the induced voltage, such that a 5$^{th}$ harmonic compensation is useful. A smooth transition is required either.

At low speeds, the high-pass filtered flux is equal to the induced voltage. The compensation is therefore equal to the induced voltage 5$^{th}$ harmonic compensation provided by:

$$\lambda = 0.064 \sin(6 \cdot \ominus) \quad (12)$$

wherein:

$\lambda$=angle error due to the 5$^{th}$ harmonic.

At high speed, the fundamental and the 5$^{th}$ harmonic components are in the stop band of the induced voltage low-pass filter. Both have a phase-lag of 90°, however the frequency of the 5$^{th}$ harmonic is negative. The phase-lag will therefore be in the position direction instead of in the negative direction, which causes a phase off-set of 180°. The magnitude of the angle error is also five times lower.

The magnitude of the high-speed compensation is ⅕ of the low-speed compensation magnitude. The correction will therefore be filtered with a filter with a pool at $T_{flux}$, a zero at $T_{flux}/5$ and a DC gain of 1, wherein $T_{flux}$ is the time constant of the high-pass flux filter. The transfer function of such a filter is:

$$H(j\omega) = \frac{j\omega T_{flux}/5 + 1}{j\omega T_{flux} + 1} \quad (13)$$

Figure 10:
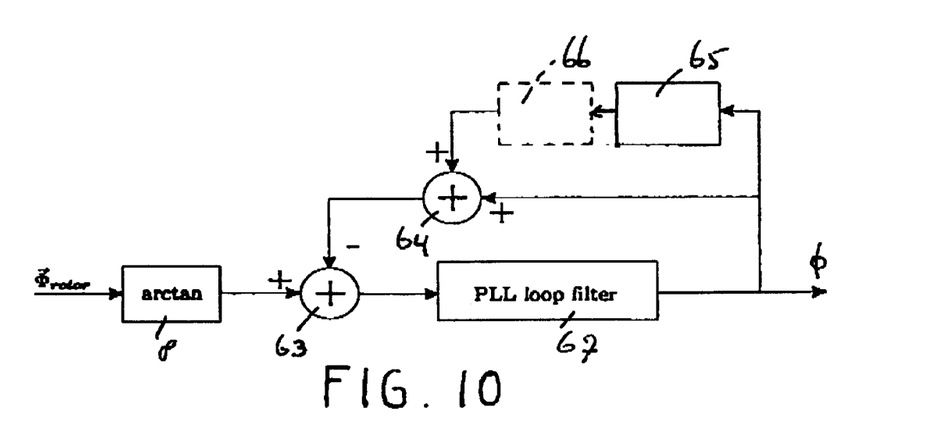
FIG. 10 is a block diagram showing a correction circuit for angle errors due to $5^{th}$ harmonic distortions.

FIG. 10 shows a correction circuit for the PLL loop filter, wherein reference numeral 65 denotes the compensation for the 5$^{th}$ harmonic component according to equation (12) and wherein, in dotted lines and denoted by reference numeral 66 the filter according to equation (13) is shown for high-speed correction of the angle error. Reference numerals 63 and 64 denote summation means.

With the complete impedance estimate and harmonic correction as disclosed above, it is possible to calculate the magnet flux vector, and thus the rotor position, within less than 10°.

Those skilled in the art will appreciate that several amendments and additions can be made, however without deviating from the inventive concept as disclosed above.

What is claimed is:

1. A method for sensorless estimation during operation of a three-phase synchronous motor, comprising a stator, having a stator winding comprising terminals for connecting terminal voltage and terminal current, and a magnetic rotor, of the relative position between said stator and said rotor, said method comprising the steps of:

low pass-filtering the terminal voltage;

low-pass filtering the terminal current;

high-pass filtering the terminal current;

determining a rotor speed of the magnetic rotor; and determining the relative angular position from the low-pass filtered terminal voltage, the low-pass filtered terminal current, and the high-pass filtered terminal current, and correcting the determined relative angular position with angular correction derived from said rotor speed.

2. A method according to claim 1, further comprising the steps of supplying said stator winding with electric energy by a pulse width modulator and determining a stator winding impedance, for use in the step of determining said relative angular position, from a modulator-induced switching ripple in the terminal voltage and the terminal current.

3. A method according to claim 2, further comprising the step of determining said stator winding impedance from a modulator-induced switching ripple in the low-pass filtered terminal voltage, the low-pass filtered terminal current, and the high-pass filtered terminal current.

4. A method according to claim 3, further comprising the steps of determining said switching ripple by removing a fundamental component by band-pass filtering after transforming the low-pass filtered terminal voltage, the low-pass filtered terminal current, and the high-pass filtered terminal current to a system of coordinates that is synchronous to said rotor.

5. A method according to claim 4, wherein said step of transformation to said system of coordinates that is synchronous to said rotor comprises the steps of rotating the low-pass filtered terminal voltage, the low-pass filtered terminal current, and the high-pass filtered terminal current through said determined relative angular position.

6. A method according to claim 5, further comprising the step of deriving an estimate of an instantaneous stator winding impedance, comprising an instantaneous resistance portion and an instantaneous inductivity portion, from said switching ripple of the low-pass filtered terminal voltage, the low-pass filtered terminal current, and the high-pass filtered terminal current.

7. A method according to claim 6, further comprising the step of estimating said instantaneous inductivity portion from a quotient of a low-pass filtered dot-product of the switching ripple of the low-pass filtered terminal voltage and the high-pass filtered terminal current, and a low-pass filtered dot-product of the switching ripple in the high-pass filtered terminal current.

8. A method according to claim 6, further comprising the step of estimating said instantaneous resistance portion from a quotient of a low-pass filtered dot-product of the switching ripple in the low-pass filtered terminal voltage and the high-pass filtered terminal current, and a low-pass filtered dot-product of the switching ripple in the low-pass filtered terminal current.

9. A method according to claim 7, further comprising the step of determining said quotient from the dot-products and continuous averages of the low-pass filtered terminal voltage, the low-pass filtered terminal current, and the high-pass filtered terminal current.

10. A method according to claim 8, further comprising the step of determining said quotient from the dot-products and continuous averages of the low-pass filtered terminal voltage, the low-pass filtered terminal current, and the high-pass filtered terminal current.

11. A method according to claim 6, further comprising the step of assuming a fixed value for said instantaneous resistance portion of said stator winding impedance.

12. A method according to claim 2, further comprising the steps of interrupting said electric energy that is supplied to said stator winding by said pulse width modulator near standstill of said rotor, and estimating said relative angular position from said stator terminal voltage measured during said interruption of said electric energy.

13. A method according to claim 12, further comprising the steps of alternatively switching said pulse width modulator to a condition of high impedance wherein no electric energy is supplied to said stator winding, and to an active condition for supplying electric energy to said stator winding, and measuring said terminal voltage during said high-impedance condition for estimating said relative angular position.

14. A method according to claim 1, further comprising the step of removing high-frequency noise from said determined relative angular position by means of non-delayed low-pass filtering in accordance with a Phase Locked Loop structure.

15. A method according to claim 1, further comprising the step of correcting said determined angular position for at least one of asymmetries in the three-phase synchronous motor; induced voltage effects at near-standstill of the rotor and near full-speed of the rotor; and $5^{th}$ harmonic disturbances.

16. A device for performing said method of claim 1.

17. A three-phase synchronous motor comprising a device according to claim 16.

* * * * *